US010133166B2

United States Patent
Ogawa (10) Patent No.: US 10,133,166 B2
(45) Date of Patent: Nov. 20, 2018

(54) LIGHT SOURCE UNIT INCLUDING A LIGHT SOURCE WITH MULTIPLE LIGHT EMITTING ELEMENTS, DIFFERENT NUMBERS OF WHICH CAN BE TURNED ON, AND PROJECTOR

(71) Applicant: CASIO COMPUTER CO., LTD., Shibuya-ku, Tokyo (JP)

(72) Inventor: Masahiro Ogawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/642,679

(22) Filed: Jul. 6, 2017

(65) Prior Publication Data

US 2018/0074390 A1    Mar. 15, 2018

(30) Foreign Application Priority Data

Sep. 15, 2016  (JP) .................................. 2016-180107

(51) Int. Cl.
  *G03B 21/20*  (2006.01)
  *H04N 9/31*  (2006.01)
  *G03B 33/06*  (2006.01)

(52) U.S. Cl.
  CPC ......... *G03B 21/206* (2013.01); *G03B 21/204* (2013.01); *G03B 21/2013* (2013.01);
  (Continued)

(58) Field of Classification Search
  CPC .. G03B 21/206; G03B 21/204; H04N 9/3158; H04N 9/3161
  See application file for complete search history.

(56) References Cited

U.S. PATENT DOCUMENTS 9,557,013 B2    1/2017  Nagase
2011/0096297 A1*  4/2011  Ogino ................... G03B 33/08
                                              353/31

(Continued)

FOREIGN PATENT DOCUMENTS

| JP | 2012128438 A | 7/2012 |
|----|--------------|--------|
| JP | 2013205648 A | 10/2013 |
| WO | 2014020728 A1 | 2/2014 |

OTHER PUBLICATIONS

Japanese Office Action dated Mar. 29, 2018 issued in counterpart Japanese Application No. 2016-180107.

*Primary Examiner* — Sultan Chowdhury
*Assistant Examiner* — Magda Cruz
(74) *Attorney, Agent, or Firm* — Holtz, Holtz & Volek PC (57) ABSTRACT

A light source unit has a first light source for emitting light in a first wavelength range, a second light source for emitting light in a second wavelength range of the same color system as the light in the first wavelength range and having a different wavelength, a third light source including light emitting elements for emitting light in a third wavelength range different from the light in the first wavelength range and in the second wavelength range, a fourth light source for emitting light in a fourth wavelength range excited by the light in the third wavelength range as luminous light, and a control unit for controlling the illumination of the first, second, third and fourth light sources, and the control unit controls the number of light emitting elements of the third light source to be illuminated according to illuminated states of the first and second light sources.

19 Claims, 6 Drawing Sheets

(52) U.S. Cl.
CPC ......... *G03B 21/2053* (2013.01); *G03B 33/06* (2013.01); *H04N 9/3158* (2013.01); *H04N 9/3161* (2013.01)

(56) References Cited

U.S. PATENT DOCUMENTS

2015/0184810 A1   7/2015  Nagase
2016/0360166 A1* 12/2016  Ogawa ................ G02B 26/008

* cited by examiner

|  | LIGHT IN A BLUE WAVELENGTH RANGE (EXCITATION LIGHT) | LIGHT IN A GREEN WAVELENGTH RANGE | LIGHT IN A RED WAVELENGTH RANGE |
|---|---|---|---|
| 511 — FIRST MODE R-LED USE | ○ ○-L3 ○ ○ ○ | L4 ⬯ | L2 ⬯ |
| 512 — SECOND MODE R-LD USE | ● ● ○ ● ● L31 | ○ L4 | ○ L1 |
| 513 — THIRD MODE R-LED + R-LD USE | ○ ○-L3 ○ ○ ○ | L4 ⬯ | L2 ⬯ (L1) |

LIGHT SOURCE UNIT INCLUDING A LIGHT SOURCE WITH MULTIPLE LIGHT EMITTING ELEMENTS, DIFFERENT NUMBERS OF WHICH CAN BE TURNED ON, AND PROJECTOR

CROSS-REFERENCE TO RELATED APPLICATION

This application is based upon and claims the benefit of priority under 35 USC 119 from Japanese Patent Application No. 2016-180107 filed on Sep. 15, 2016, the contents of which, including the specification, claims, drawings and abstract, are incorporated herein by reference.

BACKGROUND OF THE INVENTION

Field of the Invention

The present invention relates to a light source unit and a projector including this light source unit.

Description of the Related Art

In these days, data projectors are used on many occasions as image projection systems which project a screen of a personal computer or a screen of video equipment, as well as images based on image data stored on a memory card onto a screen. These projectors are such that light emitted from a light source is collected onto a micromirror display device called a digital micromirror device (DMD) or a liquid crystal panel, so that a color image is projected onto a screen for display thereon.

Conventionally, in the mainstream of these projectors, high-intensity discharge lamps have been used as a light source. In recent years, however, various types of projectors have been developed which use, as a light source, light emitting diodes (LEDs), laser diodes (LDs), organic electroluminescence, or luminescent material.

A projector disclosed in Japanese Unexamined Patent Publication No. 2012-128438 includes a first light source which emits a laser beam in a blue wavelength range, a color wheel and a second light source which emits light in a red wavelength range. The color wheel includes a luminescent material layer which receives a laser beam as excitation light to generate light in a green wavelength range and a diffuse layer which transmits the laser beam incident thereon while diffusing it, and the luminescent material layer and the diffuse layer being disposed end to end in a circumferential direction. In the light source unit, a light emitting period during which the first light source emits light in the green wavelength range and a light emitting period during which the second light source emits light in the red wavelength range are partially overlapped so as to generate light source light of a mixed color.

By being configured in the way described above, the light source unit disclosed in Japanese Unexamined Patent Publication No. 2012-128438 described above can deal with a desired color environment in relation to color balance and the brightness of a projected image at all times.

In general, luminosity factors differ from wavelength to wavelength. For example, the luminosity factor of light in the red wavelength range is relatively lower than those of light in other wavelength ranges of colors. Consequently, in the case where it is desired that a highly bright image is projected by the use of the projector disclosed in Patent Literature 1, it is necessary to enlarge the size and output of the red light source greater than those of the blue light source and the green light source which emit blue light and green light both having higher luminosity factors than that of red light to increase the luminance of the red light source. However, when the size and output of the light source which emits light having the lower luminosity factor are enlarged, there may be caused fears that the arrangement of constituent optical parts becomes inefficient or the luminous efficiency of the light source is lowered due to the heat value thereof being increased. In addition, in the case where the luminance of a wavelength component of the light source light which has a low luminosity factor is low, the extent to which the brightness and color balance of a projected image is adjusted becomes narrow.

SUMMARY OF THE INVENTION

The invention has been made in view of the situations described above, and an object thereof is to provide a light source unit which can control the intensity of light for generating an image to adjust the brightness and color balance of the image generated to a wide extent and a projector which includes this light source unit.

According to an aspect of the invention, there is provided a light source unit having:

a first light source for emitting light in a first wavelength range;

a second light source for emitting light in a second wavelength range which is of the same color system as the light in the first wavelength range and whose wavelength differs from that of the light in the first wavelength range;

a third light source including a plurality of light emitting elements for emitting light in a third wavelength range which differs from the light in the first wavelength range and the light in the second wavelength range;

a fourth light source for emitting light in a fourth wavelength range which is excited by the light in the third wavelength range as luminous light; and a control unit for controlling the illumination of the first light source, the second light source, the third light source and the fourth light source, wherein the control unit controls the number of light emitting elements in the plurality of light emitting elements of the third light source which are to be illuminated according to illuminated states of the first light source and the second light source.

According to another aspect of the invention, there is provided a projector having:

the light source unit described above;

a display device on to which light source light is shone from the light source unit to thereby form image light; and a projection-side optical system for projecting the image light emitted from the display device on to a screen, wherein the control unit controls the display device and the light source unit.

DETAILED DESCRIPTION OF THE PREFERRED EMBODIMENT

Figure 1:
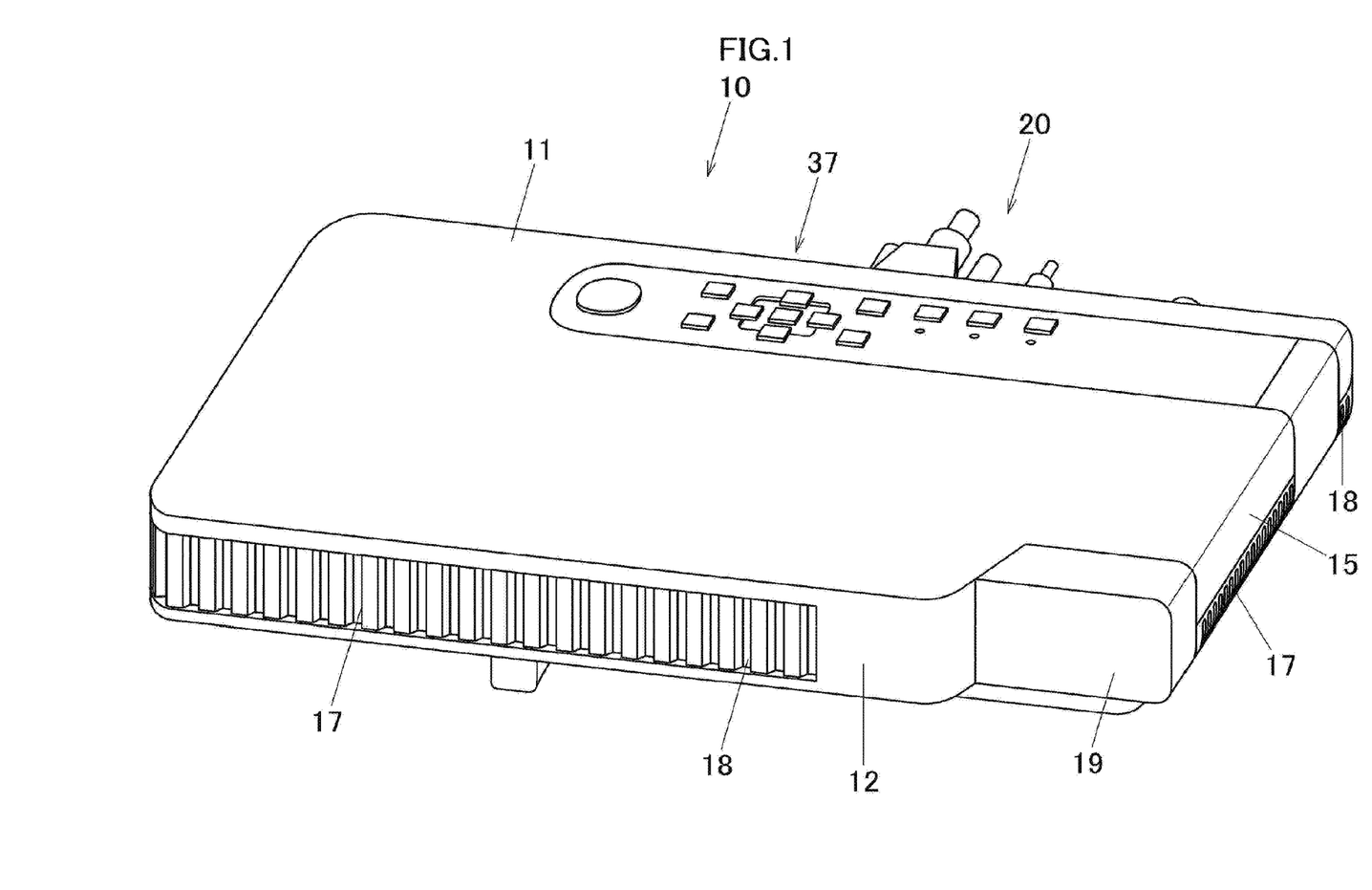
FIG. 1 is an external perspective view showing a projector according to an embodiment of the invention.

Hereinafter, an embodiment of the invention will be described. FIG. 1 is an external perspective view of a projector 10 according to this embodiment. In this embodiment, when referred to in relation to the projector 10, left and right denote, respectively, left and right in relation to the projecting direction of the projector 10, and when referred to in relation to the projector 10, front and rear denote, respectively, front and rear in relation to the direction of a screen and a traveling direction of a pencil of light that is emitted from the projector 10 towards the screen.

As is shown in FIG. 1, the projector 10 has a substantially rectangular parallelepiped shape and has a lens cover 19 for covering a projection port at an end of a front panel 12 which makes up a front panel of a casing of the projector 10. Pluralities of outside air inlet holes 18 and inside air outlet holes 17 are provided in the front panel 12. Further, although not shown, the projector 10 includes an IR reception unit which receives a control signal from a remote controller.

In addition, a keys/indicators unit 37 is provided on an upper panel 11 of the casing. Disposed on this keys/indicators unit 37 are keys and indicators which include a power supply switch key, a power indicator, a projection switch key, and an overheat indicator. The power indicator informs whether a power supply is on or off. The projection switch key switches on or off the projection by the projector 10. The overheat indicator informs of an overheat condition occurring in a light source unit, a display device, a control circuit or the like when they really overheat.

Further, various types of terminals 20 including an input/output connector unit, a power supply adaptor plug and the like are provided on a back panel of the casing. The input/output connector unit includes a USB terminal, a video signal input D-SUB terminal, an S terminal, an RCA terminal and the like. Additionally, a plurality of outside air inlet holes are formed in the back panel. A plurality of inside air outlet holes 17 are formed in each of a right panel, not shown, which is a side panel of the casing and a left panel 15 which is a side panel shown in FIG. 1. A plurality of outside air inlet holes 18 are formed in a corner portion between the left panel 15 and the back panel.

Figure 2:
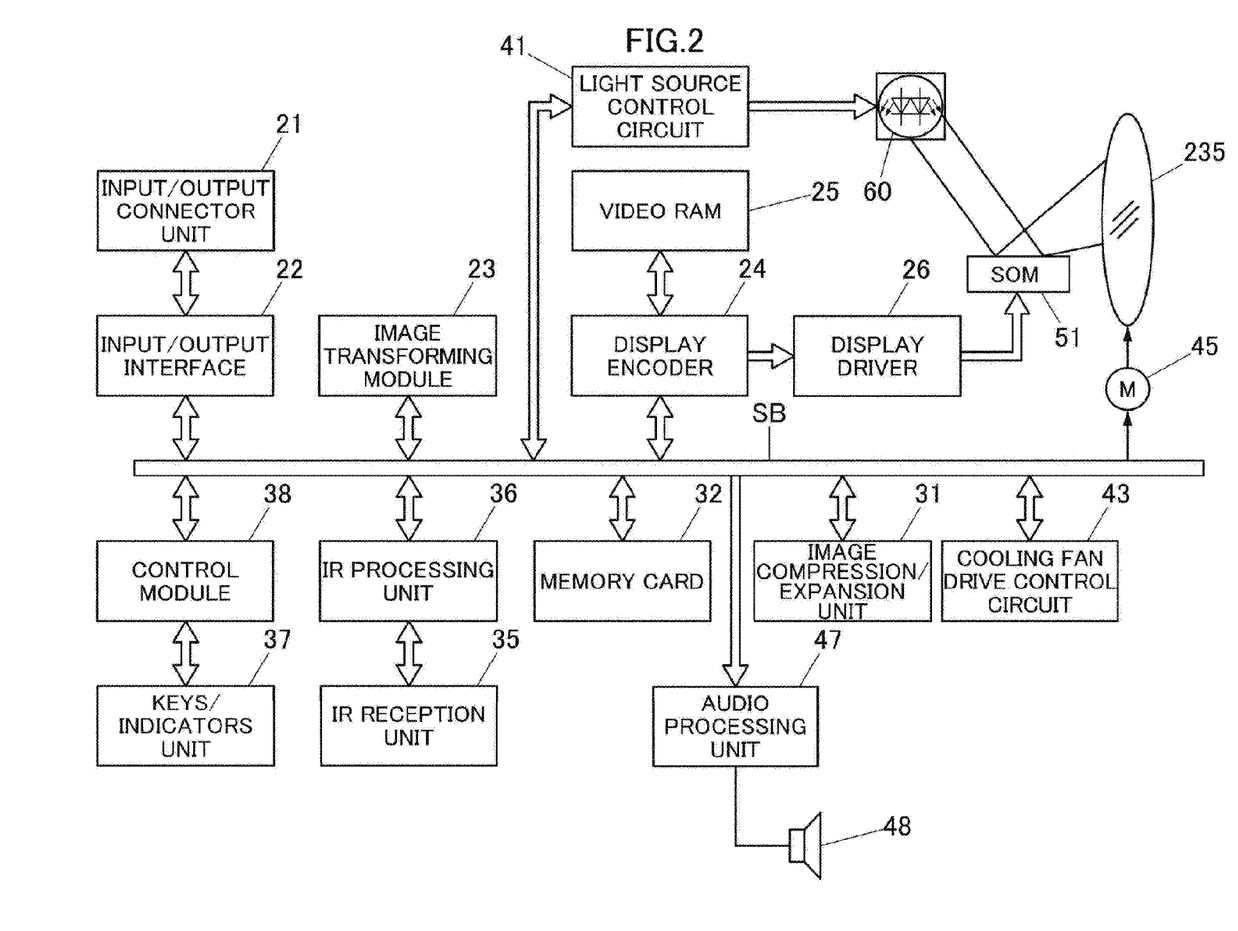
FIG. 2 is a block diagram showing functional circuitry blocks of the projector according to the embodiment of the invention.

Next, a projector control unit of the projector 10 will be described by the use of a block diagram of functional circuitry blocks shown in FIG. 2. The projector control unit includes a control module 38, an input/output interface 22, an image transforming module 23, a display encoder 24, a display driver 26 and the like. Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module. The display driver 26 drives a display device 51, which is a spatial optical modulator (SOM), at an appropriate frame rate in response to the image signal outputted from the display encoder 24. The projector 10 shines a pencil of light which is emitted from a light source unit 60 on to the display device 51 by way of a light guiding optical system, whereby an optical image is formed by using reflected light which is reflected by the display device 51. The image so formed is then projected on to a screen, not shown, for display thereon by way of a projection-side optical system, which will be described later. In addition, a movable lens group 235 of the projection-side optical system is driven by a lens motor 45 for zooming or focusing.

An image compression/expansion unit 31 performs a recording operation in which a luminance signal and a color difference signal of an image signal are data compressed through ADCT and Huffman coding processes and the compressed data is sequentially written on a memory card 32 which is configured as a detachable recording medium. Further, when in a reproducing mode, the image compression/expansion unit 31 reads out the image data recorded on the memory card 32 and expands the individual image data which make up a series of dynamic images frame by frame. Then, the image compression/expansion unit 31 outputs the image data to the display encoder 24 byway of the image transforming module 23 so as to enable the display of dynamic images based on the image data stored on the memory card 32.

The control module 38 governs the control of operations on circuitries within the projector 10 and includes a ROM which stores operation programs of a CPU and various settings in a fixed fashion and a RAM which is used as a working memory.

Then, operation signals generated at the keys/indicators unit 37 which includes the main keys and indicators which are provided on the upper panel 11 are sent out directly to the control module 38. Key operation signals from the remote controller are received by the IR reception unit 35, and a code signal demodulated at an IR processing unit 36 is outputted to the control module 38.

The control module 38 is connected to an audio processing unit 47 by way of the system bus (SB). This audio processing unit 47 includes a circuitry for a sound source such as a PCM sound source. When the projector 10 is in a projection mode and the reproducing mode, the audio processing unit 47 converts audio data into analog signals and drives a speaker 48 to output loudly sound or voice based on the audio data.

The control module 38 controls a light source control circuit 41 which is configured as a light source control unit. The light source control circuit 41 controls separately the operation of an excitation light shining device 70 (refer to FIG. 3) of the light source unit 60 so that light in specified wavelength ranges which are required in producing an image is emitted from the light source unit 60. In addition, the light source control circuit 41 controls a timing at which a luminescent wheel 101 and the like are synchronized according to a projection mode based on an instruction from the control module 38. In this embodiment, the projector 10 includes a first mode to a third mode. In the first mode, variations in color balance and luminance distribution of light source light can be reduced. In the second mode, color purity of light in a red wavelength range can be enhanced. In the third mode, light in the red wavelength range can be made bright. As will be described in a description made in relation to FIG. 3, light in a red wavelength range is emitted from a red light source 151 which is a light emitting diode in the first mode. In the second mode, light in a red wavelength range is emitted from a red light source 121 which is a laser diode. In the third mode, light in the red wavelength ranges is emitted from the red light source 151 and the red light source 121.

Further, the control module 38 causes a cooling fan drive control circuit 43 to detect temperatures through a plurality of temperature sensors which are provided in the light source unit 60 so as to control the rotating speeds of cooling fans based on the results of the temperature detections. Additionally, the control module 38 also causes the cooling fan drive control circuit 43 to keep the cooling fans rotating by use of a timer even after the power supply to the main body of the projector 10 is switched off. Alternatively, the control module 38 causes the cooling fan drive control circuit 43 to cut off the power supply to the main body of the projector 10 depending upon the results of the temperature detections by the temperature sensors.

Figure 3:
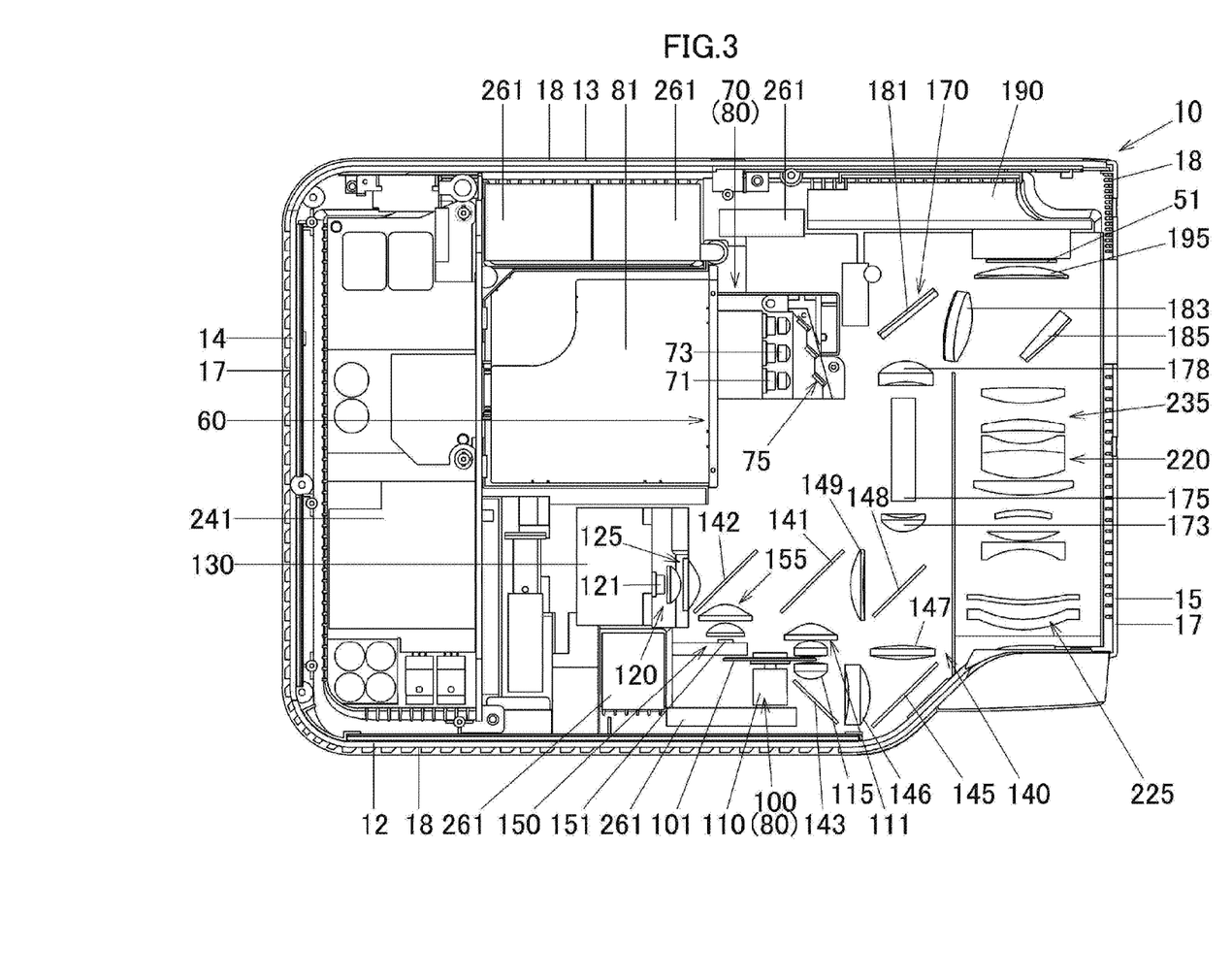
FIG. 3 is a schematic plan view showing an internal construction of the projector according to the embodiment of the invention.

FIG. 3 is a schematic plan view showing an internal construction of the projector 10. The projector 10 includes a control circuit board 241 near the right panel 14. This control circuit board 241 includes a power supply circuit block and a light source control block. In addition, the projector 10 includes the light source unit 60 which is disposed to a side of the control circuit board 241, that is, in a virtually central portion of the casing. Further, in the projector 10, a light source-side optical system 170 and a projection-side optical system 220 are disposed between the light source unit 60 and the left panel 15.

The light source unit 60 includes the excitation light shining device 70 which functions not only as a light source of light in a blue wavelength range (light in a third wavelength range) but also as an excitation light source, a green light source device 80 which is referred to a light source of light in a green wavelength range (light in a fourth wavelength range), a first red light source device 120 and a second red light source device 150, the first and second red light sources 120, 150 constituting a red light source device of light in red wavelength ranges. The green light source device 80 is made up of the excitation light shining device 70 and a luminescent wheel device 100. Then, the light source unit 60 includes a light guiding optical system 140 which guides and emits the light in the red, green and blue wavelength ranges. The light guiding optical system 140 guides the light in the blue, green and red wavelength ranges emitted from the light source devices (the excitation light shining device 70, the green light source device 80, the first red light source device 120) to the light source-side optical system 170.

The excitation light shining device 70 is disposed substantially at the center of the casing of the projector 10 in relation to a left-right or transverse direction thereof and near the back panel 13. Then, the excitation light shining device 70 includes a group of light sources which is made up of blue laser diodes (a third light source) 71 which are a plurality of semiconductor light emitting elements which are disposed so that optical axes thereof are parallel to the back panel 13, a group of reflection mirrors 75 configured to change axes of rays of light emitted from the corresponding blue laser diodes 71 through 90 degrees towards the front panel 12, and a heat sink 81 which is disposed between the blue laser diodes 71 and the right panel 14.

The light source group is made up of the plurality of blue laser diodes 71 which are arranged into a planar configuration. In this embodiment, a total of five blue laser diodes 71 are provided. When looking at the light source group from the left panel 15 side and from thereabove, four blue laser diodes 71 are arranged in two rows by two columns, and further, one blue laser diode 71 is disposed at the center of the four laser diodes 71. Additionally, assuming that an up-down or vertical direction in FIG. 3 is referred to as a row and a direction normal to a surface of a piece of paper on which FIG. 3 is drawn is referred to as a column, a plurality of blue laser diodes 71 may be arranged into a matrix configuration.

A plurality of collimator lenses 73 are disposed on optical axes of the blue laser diodes 71, and these collimator lenses 73 convert light emitted from the corresponding blue laser diodes 71 into parallel light so as to enhance the directivity of the emitted light. The reflecting mirror group 75 is made up of a plurality of reflecting mirrors which are arranged into a stair and are integrated with a substrate. The reflecting mirrors 75 narrow pencils of light emitted from the corresponding blue laser diodes 71 in one direction and emit the pencils of light towards a second dichroic mirror 141.

A cooling fan 261 is disposed between the heat sink 81 and the back panel 13, and the blue laser diodes 71 are cooled by this cooling fan 261 and the heat sink 81. Further, a cooling fan 261 is also disposed between the reflecting mirror group 75 and the back panel 13, and the reflecting mirror group 75 is cooled by this cooling fan 261.

The luminescent wheel device 100 which makes up the green light source 80 is disposed on an optical path of excitation light emitted from the excitation light shining device 70 and near the front panel 12. The luminescent wheel device 100 includes a luminescent wheel 101, a motor 110, a collective lens group 111, and a collective lens 115. The luminescent wheel 101 is disposed so as to be substantially parallel to the front panel 12, that is, so as to be at right angles to an axis of light emitted from the excitation light shining device 70. The luminescent wheel 101 has the shape of a substantially circular disk and is fixed rotatably to a shaft portion of the motor 110 at a central portion thereof. A transmitting segment and a green luminescent material body (a fourth light source) are provided end to end in a circumferential direction near an outer circumferential edge of the luminescent wheel 101. Light in a blue wavelength range emitted from the excitation light shining device 70 is shone on to either of the transmitting segment and the green luminescent material body.

The transmitting segment 310 diffuse transmits light in the blue wavelength range shone on thereto from a front side towards a rear side of the luminescent wheel 101. When light in the blue wavelength range emitted from the excitation light shining device 70 is shone on thereto, the green luminescent material body emits light in a green wavelength range as luminous light.

The motor 110 drives the luminescent wheel 101 rotationally. The collective lens group 111 collects a pencil of excitation light emitted from the excitation light shining device 70 to the luminescent wheel 101 and collects a pencil of light which is emitted from the luminescent wheel 101 in the direction of the back panel 13. The collective lens 115 collects a pencil of light which is emitted from the luminescent wheel 101 in the direction of the front panel 12. A cooling fan 261 is disposed on a side of the motor 110 which faces the front panel 12, and the luminescent wheel device 100 and the like are cooled by this cooling fan 261.

The first red light source device 120 includes the red light source (a first light source) 121 which is disposed so that an optical axis thereof becomes parallel to the blue laser diodes 71 and a collective lens group 125 which collects light emitted from the red light source 121. The red light source 121 is a red laser diode which is a semiconductor light emitting element which emits light in a red wavelength range (a first wavelength range). Then, the red light source device 120 is disposed so that an axis of light in the red wavelength emitted from the red light source device 120 intersects an axis of light in the green wavelength range emitted from the luminescent wheel 101.

The second red light source device 150 includes the red light source (a second light source) 151 and a collective lens group 155 which collects light emitted from the red light source 151. The red light source 151 is a red light emitting diode which is a semiconductor light emitting element which emits light in a red wavelength range (light in a second wavelength range). The second red light source device 150 is disposed so that an axis of light in the red wavelength range emitted from the second red light source device 150 intersects an axis of light in the red wavelength range emitted from the first red light source device 120.

The first red light source device 120 includes a heat sink 130 which is disposed on a side of the red light source 121 which faces the right panel 14. The, a cooling fan 261 is disposed between the heat sink 130 and the front panel 12, and the red light source 121 is cooled by this cooling fan 261 and the heat sink 130.

The light guiding optical system 140 is made up of collective lenses which collect pencils of light in the red, green and blue wavelength ranges, reflecting mirrors and dichroic mirrors which change axes of pencils of light in the red, green and blue wavelength ranges so that the axes are aligned in the same direction. Hereinafter, those members will be described individually.

A second dichroic mirror 141 is disposed between the reflecting mirror group 75 and the collective lens group 111. The second dichroic mirror 141 transmits light in the blue wavelength range and light in the red wavelength ranges and reflects light in the green wavelength range. Additionally, a first dichroic mirror 142 is disposed between the first red light source device 120 and the second dichroic mirror 141 and to the rear of the second red light source device 150. The first dichroic mirror 142 is disposed in a position where an axis of light in the red wavelength range emitted by the second light source device 150 intersects an axis of light in the red wavelength range emitted by the first red light source device 120.

Figure 4:
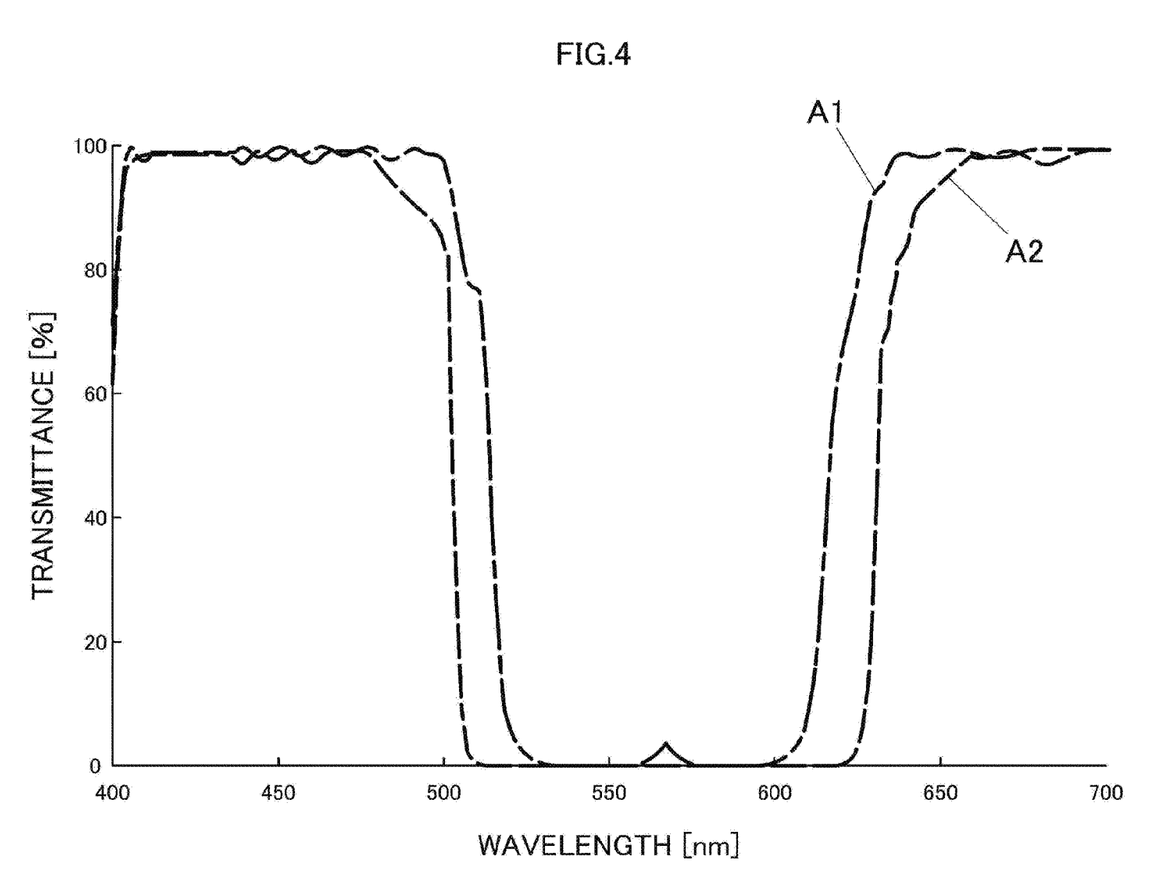
FIG. 4 is a spectral distribution chart of a first dichroic mirror according to the embodiment of the invention.

FIG. 4 is a spectral distribution chart of the first dichroic mirror 142. This chart shows a transmission property A1 for light which is incident on the first dichroic mirror 142 as p-polarized light and a transmission property A2 for light which is incident on the same dichroic mirror as s-polarized light. The first dichroic mirror 142 transmits light in a wavelength range of about 400 nm to about 510 nm and reflects light in a wavelength range of about 510 nm to about 620 nm in relation to p-polarized light. Additionally, the first dichroic mirror 142 transmits light in a wavelength range of about 620 nm or longer in relation to p-polarized light. The first dichroic mirror 142 transmits light in a wavelength range of about 400 nm to about 500 nm and reflects light in a wavelength range of about 500 nm to about 630 nm in relation to s-polarized light. Additionally, the first dichroic mirror 142 transmits light in a wavelength range of about 630 nm or longer in relation to s-polarized light. Thus, in the first dichroic mirror 142, the wavelength range where p-polarized light is transmitted is wider than the wavelength range where s-polarized light is transmitted in a wavelength range of 400 nm to 700 nm.

It is possible to determine in advance which of these transmission properties A1, A2 is made use of according to a wavelength and polarization property of light which is incident on the first dichroic mirror 142. In this embodiment, a case will be described as an example where light in the red wavelength range emitted from the red light source 121 is incident on the first dichroic mirror 142 in the form of p-polarized light.

Figure 5:
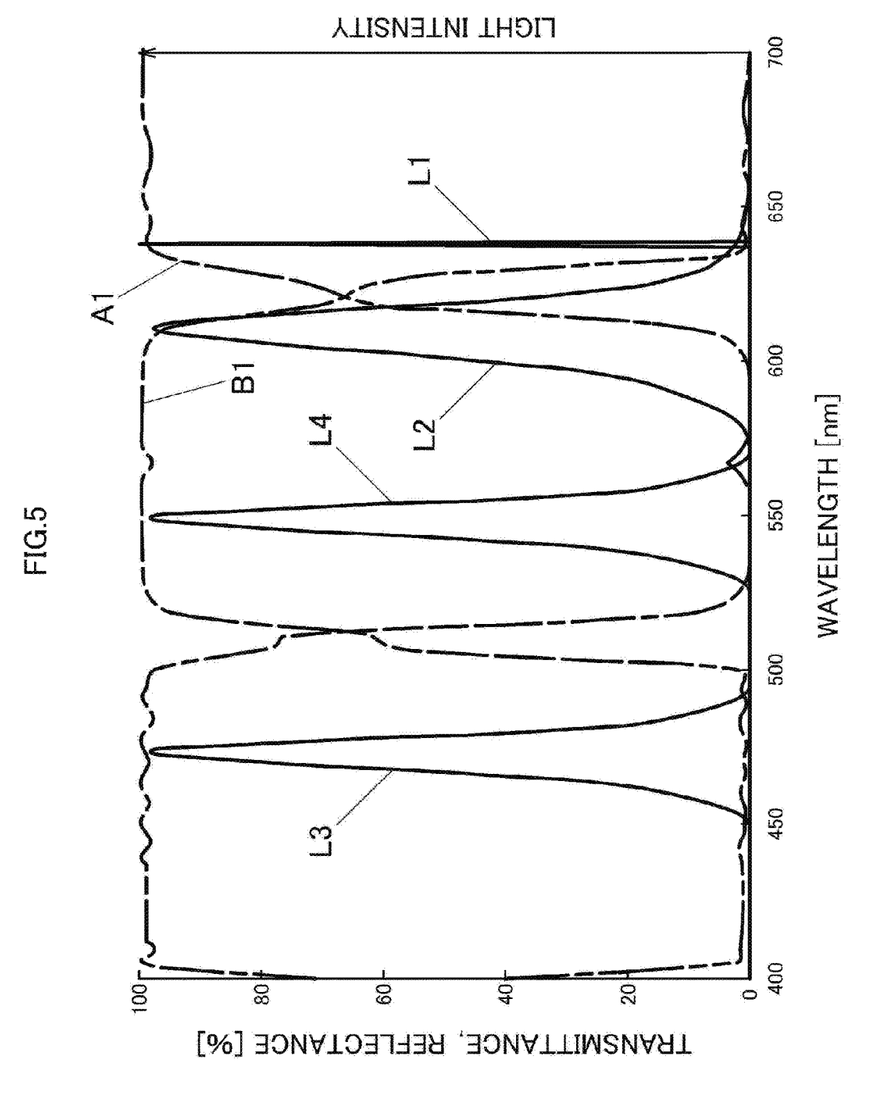
FIG. 5 is a spectral distribution chart of the first dichroic mirror according to the embodiment of the invention and incident light thereon.

FIG. 5 is a spectral distribution chart of the first dichroic mirror 142 and incident light thereon. A first axis of ordinate on the left denotes transmittance and reflectance [%], and a second axis of ordinate on the right denotes light intensity. An axis of abscissa denotes a wavelength [nm] of light. FIG. 5 shows a distribution curve of light in the red wavelength range (the light in the first wavelength range) L1 which is emitted from the red light source (the first light source) 121, a distribution curve of light in the red wavelength range (the light in the second wavelength range) L2 which is emitted from the red light source (the second light source) 151, the transmission property A1 of the first dichroic mirror 142 for p-polarized light and a reflection property B1 of the first dichroic mirror 142.

The light in the red wavelength range L1 is light whose wavelength range is in the range of 10 nm or shorter and whose peak wavelength is about 640 nm. The light in the red wavelength range L2 is light whose wavelength range is in the range of about 580 nm to about 640 nm and whose peak wavelength is about 610 nm. Thus, most of the wavelength of the light in the red wavelength range L1 is longer than the wavelength range of the light in the red wavelength range L2. Additionally, the intensity of the light in the red wavelength range L1 at its peak wavelength is substantially equal to the intensity of the light in the red wavelength range L2 at its peak wavelength.

The first dichroic mirror 142 having the transmission property A1 transmits most of light in a blue wavelength range L3 whose wavelength range is in the range of about 450 nm to about 490 nm and whose peak wavelength is about 470 nm and part of a longer wavelength side of the light in the red wavelength range and reflects most of light in a green wavelength range L4 whose wavelength range is in the range of about 530 nm to about 570 nm and whose peak wavelength is about 550 nm and part of a shorter wavelength side the light in the red wavelength range.

According to the transmission property A1 of the first dichroic mirror 142, the first dichroic mirror 142 transmits the light in the red wavelength range L1 which is emitted from the red light source 121 to be incident thereon in the form of p-polarized light and reflects the light in the red wavelength range L2 which is emitted from the red light source 151, whereby the light in the red wavelength range L1 and the light in the red wavelength range L2 which are of the same color system can be aligned into a single pencil of light which travels on the same optical path.

Returning to FIG. 3, the light in the green wavelength range which is reflected by the second dichroic mirror 141 and the light in the red wavelength which is combined on the first dichroic mirror 142 are emitted in the direction of the left panel 15.

A first reflecting mirror 143 is disposed on an axis of light in the blue wavelength range which is transmitted or diffuse transmitted through the luminescent wheel 101, that is, between the collective lens 115 and the front panel 12. The first reflecting mirror 143 reflects the light in the blue wavelength range to change the direction of the axis thereof through 90 degrees in the direction of the left panel 15. A collective lens 146 is disposed on a side of the first reflecting mirror 143 which faces the left panel 15, and further, a second reflecting mirror 145 is disposed on a side of the collective lens 146 which faces the left panel 15. The second reflecting mirror 145 changes the direction of the axis of the light in the blue wavelength range which is incident thereon from the collective lens 146 through 90 degrees in the direction of the back panel 13.

A collective lens 147 is disposed on a side of the second reflecting mirror 145 which faces the back panel 13. Additionally, a third dichroic mirror 148 is disposed on a side of a collective lens 149 which faces the left panel 15 and a side of the collective lens 147 which faces the back panel 13. The third dichroic mirror 148 reflects light in the green wavelength range and light in the red wavelength ranges to change the directions of axes of the green light and the red light through 90 degrees in the direction of the back panel 13 and transmits light in the blue wavelength range. Light in the blue wavelength range which is collected by the collective lens 147 is transmitted through the third dichroic mirror 148 and is then collected to a collective lens 173 of the light source-side optical system 170.

On the other hand, the collective lens 149 is disposed on aside of the second dichroic mirror 141 which faces the left panel 15. The axes of the light in the green wavelength range which is reflected by the second dichroic mirror 141 and the light in the red wavelength ranges which is transmitted through the second dichroic mirror 141 are incident on the collective lens 149. The light in the green wavelength range and the light in the red wavelength ranges which are collected by the collective lens 149 are reflected by the third dichroic mirror 148 and are then collected to the collective lens 173 of the light source-side optical system 170. In this way, the light in the blue wavelength range, the light in the green wavelength range and the light in the red wavelength ranges are guided to the light source-side optical system 170.

The light source-side optical system 170 is made up of the collective lens 173, a light tunnel 175, a collective lens 178, a light axis changing mirror 181, a collective lens 183, a shining mirror 185, and a condenser lens 195. Since the condenser lens 195 emits image light emitted from the display device 151 which is disposed on a side of the condenser lens 195 which faces the back panel 13 towards the projection-side optical system 220, the condenser lens 195 also makes up part of the projection-side optical system 220.

The collective lens 173 is disposed near an entrance or incident port of the light tunnel 175 to collect light source light. Rays of light in the red, green and blue wavelength ranges which are collected by the collective lens 173 are emitted therefrom towards the light tunnel 175.

The light axis changing mirror 181 is disposed on an optical axis of the light tunnel 175 which extends from an end thereof which faces the back panel 13 and to the rear of the collective lens 178. A pencil of light emitted from an exit port of the light tunnel 175 is collected by the collective lens 178, whereafter the axis of the pencil of light so collected is changed towards the left panel 15 by the light axis changing mirror 181.

The pencil of light reflected by the light axis changing mirror 181 is collected by the collective lens 183 to thereafter be shone on to the display device 51 at a predetermined angle byway of the condenser lens 195 by the shining mirror 185. The display device 51, which is a DMD, has a heat sink 190 which is provided on a side thereof which faces the back panel 13, and the display device 51 is cooled by this het sink 190.

The pencil of light which is the light source light which is shone on to an image forming plane of the display device 51 by the light source-side optical system 170 is reflected on the image forming plane of the display device 51 and is projected on to a screen byway of the projection-side optical system. 220 as projected light. Here, the projection-side optical system 220 is made up of the condenser lens 195, the movable lens group 235 and a fixed lens group 225. The movable lens group 235 is configured so as to be moved by the lens motor. Then, the movable lens group 235 and the fixed lens group 225 are incorporated in a fixed lens barrel. Thus, the fixed lens barrel including the movable lens group 235 is configured as a variable-focus lens which enables zooming and focusing.

By configuring the projector 10 in the way described heretofore, when the luminescent wheel 101 is rotated and light is emitted at appropriate timings from the excitation light shining device 70 and the first red light source device 120, light in the blue wavelength range, light in the green wavelength range and light in the red wavelength range are incident on the display device 51 by way of the light guiding optical system 140 and the light source-side optical system 170. Due to this, the DMD, which is the display device 51, of the projector 10 displays light in the red, green and blue wavelength ranges in a time sharing fashion according to data, whereby a color image can be projected on to the screen.

Next, an illuminating control of the light sources will be described. In the light source unit 60, the red light sources 121, 151 are used separately according to a projection mode to be used, and the light source unit 60 emits one or both of the light in the red wavelength range L1 and the light in the red wavelength range L2 by sharing time with the light of the other colors. In this embodiment, the light source unit 60 emits the light in the red wavelength ranges in the first mode where the red light source 151, which is the light emitting diode (R-LED), is driven, in the second mode where the red light source 121, which is the laser diode (R-LD), is drive, and in the third mode where the red light source 151 and the red light source 121 are drive. Hereinafter, the first to third modes will be described individually.

Figure 6:
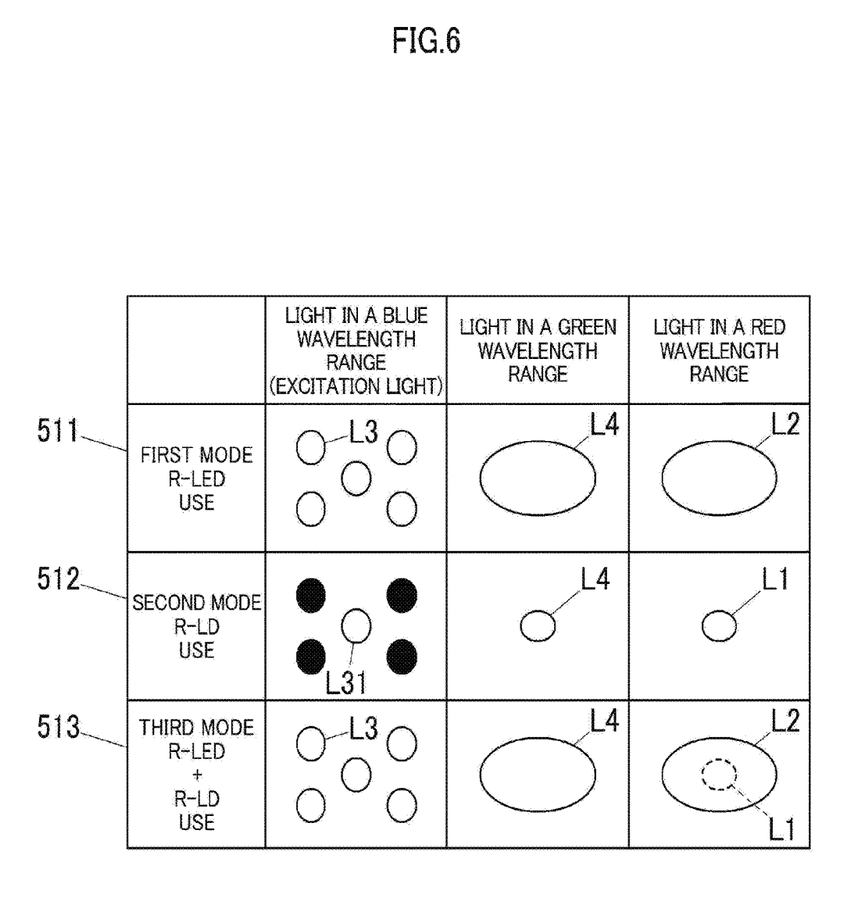
FIG. 6 is a schematic view showing cross-sectional areas of pencils of light in a blue wavelength range, a green wavelength range and red wavelength ranges in illuminating modes according to the embodiment of the invention.

FIG. 6 is a schematic view showing cross-sectional areas of pencils of light in the blue wavelength range, the green wavelength range and the red wavelength ranges in the illuminating modes. In this diagram, cross sections of the pencils of light taken in the position of the collective lens 173 shown in FIG. 3 are shown schematically. In this table, black circles indicate that the light source is turned off, whereas white circles and ellipses indicate that the light sources are turned on.

In the first mode 511, the light source unit 60 drives the red light source 151. Since the red light source 151 is the light emitting diode, light in the red wavelength range L2 is emitted as light which resembles diffuse light having a predetermined emerging angle.

In the first mode 511, the light source unit 60 illuminates the whole of the plurality of blue laser diodes 71. Additionally, in the first mode 511, the light source unit 60 shines light in the blue wavelength range L3 which is emitted by illuminating the whole of the plurality of blue laser diodes 71 widely on an effective zone of the green luminescent material body of the luminescent wheel 101.

In the second mode 512, the light source unit 60 drives the red light source 121. Since the red light source 121 is the laser diode, the red light source 121 emits light in the red wavelength range L1 as light which resembles parallel light having a narrow emerging angle. Thus, a cross-sectional area of the light in the red wavelength range L1 in the second mode 512 is, as shown in FIG. 6, relatively narrower than that of the light in the red wavelength range L2 in the first mode 511.

In the second mode 512, the light source unit 60 illuminates the central blue laser diode 71 in the plurality of blue laser diodes 71. In this embodiment, the plurality of, that is, five blue laser diodes 71 are arranged into the planar configuration with four blue laser diodes 71 disposed along the periphery of the planar configuration and one blue laser diode 71 disposed in the center thereof. In this second mode 512, the central blue laser diode 71 is illuminated to emit light in the blue wavelength range L31. Four black circles in FIG. 6 indicate that the peripherally disposed four blue laser diodes 71 are turned off. Due to this, a cross-sectional area of the light in the blue wavelength range L31 which is emitted as light source light of the light source unit 60 in this mode becomes relatively narrower than that of the light in the blue wavelength range L3 emitted in the first mode 511. Additionally, in the second mode 512, the light source unit 60 shines the light in the blue wavelength range L31 which is emitted by illuminating the central blue laser diode 71 on to an effective range of the green luminescent material body of the luminescent wheel 101. Thus, a cross-sectional area of light in the green wavelength range L4 which is emitted as light source light of the light source unit 60 becomes relatively narrower than that of light in the green wavelength range L4 which is emitted in the first mode 511.

In the third mode, the light source unit 60 drives the red light source 151 and the red light source 121. Light in the red wavelength range L2 emitted from the red light source 151 and light in the red wavelength range L1 emitted from the red light source 121 are combined on the first dichroic mirror 142 shown in FIG. 3 into the same optical path as a single pencil of light traveling thereon. Thus, a combined cross-sectional area of the light in the red wavelength ranges L1, L2 becomes, as shown in FIG. 6, substantially equal to that of the light in the red wavelength range L2 emitted in the first mode 511.

In the third mode 513, the light source unit 60 illuminates the whole of the plurality of blue laser diodes 71. Thus, with light in the blue wavelength range L3 emitted as light source light of the light source unit 60, a cross-sectional area of the whole of the pencil of blue light becomes substantially equal to that of the light in the blue wavelength range L3 which is emitted in the first mode 511. Additionally, in the third mode 513, the light source unit 60 illuminates the whole of the plurality of blue laser diodes 71 to emit light in the blue wavelength range L3 and shines widely the light in the blue wavelength range L3 on to the effective zone of the green luminescent material body of the luminescent wheel 101. Thus, an overall cross-sectional area of light in the green wavelength range L4 emitted as light source light of the light source unit 60 becomes substantially equal to that of light in the green wavelength range L4 emitted in the first mode 511.

In FIG. 6, the control unit controls the number of light illuminating elements in the plurality of light emitting elements of the third light source which are to be illuminated according to the illuminated states of the first light source and the second light source. As this occurs, the number of blue laser diodes 71 which emit light in the blue wavelength range L3 is the same in the first mode 511 and the third mode 513. However, since the control unit illuminates only the R-LED in the first mode, whereas in the third mode 513, the control unit illuminates both R-LD and R-LED, the control unit may control so that the number of light emitting elements of the third light source which are to be illuminated in the third mode where the second light source and the first light source are illuminated becomes greater than the number of light emitting elements of the third light source which are to be illuminated in the first mode where the second light source, which is the light emitting diode, is illuminated.

Namely, the control unit controls so that the number of light emitting elements of the third light source which are to be illuminated in the first mode where the second light source, which is the light emitting diode, is illuminated, the number of light emitting elements of the third light source which are to be illuminated in the second mode where the first light source, which is the laser diode, is illuminated and the number of light emitting elements of the third light source which are to be illuminated in the third mode where the second light source and the first light source are illuminated differ from one another.

Specifically, the control unit controls, for example, so that one light emitting element is illuminated in the second mode 512 shown in FIG. 6, four light emitting elements are illuminated in the first mode 511, and five light emitting elements are illuminated in the third mode 513 and controls so that the number of illuminating elements to be illuminated differs from mode to mode.

Two lead terminals are formed on each of the blue laser diodes 71, which are light emitting elements, and in the whole of the plurality of blue laser diodes 71, lead terminals of at least a group of adjacent blue laser diodes 71 are connected in series. The third light source has a plurality of groups of a plurality of light emitting elements which are connected in series.

For example, the plurality of blue laser diodes 71 are aligned into a straight line vertically and horizontally. One of the two lead terminals of the blue laser diode 71 is connected to the other of the two lead terminals of the horizontally adjacent blue laser diode 71.

There are provided two or more pairs of blue laser diodes 71 which are connected in series in the way described above, whereby even in the event that one pair of blue laser diodes 71 fails to be illuminated for some reason while the projector 10 is in use, the other pair of blue laser diodes 71 can still be illuminated. Thus, the projector 10 can be kept in use without interruption.

The blue laser diodes 71 are such that, in the third mode 513, in the whole of the plurality of blue laser diodes 71, light in the blue wavelength range whose intensity is relatively less intense can be emitted from the peripheral blue laser diodes 71 or light in the blue wavelength range whose intensity is relatively more intense can be emitted from the central blue laser diode 71.

Thus, the light source unit 60 of the embodiment of the invention includes the plurality of red light source devices 121, 151 which emit light in the red wavelength ranges which have the different wavelengths. In the first mode 511, the red light source 151, which is the light emitting diode, is driven to emit light in the red wavelength range L2, whereby variations in color balance and luminance distribution can be reduced. In the second mode, the red light source 121, which is the laser diode, is driven to emit light in the red wavelength range L1 which is situated on the longer wavelength side of the red wavelength range, whereby the color purity of the light in the red wavelength range can be enhanced. Additionally, in the third mode 513, the two red light sources 121, 151 are driven to emit bright light in the red wavelength range as light source light emitted from the light source unit 60. In this way, it is possible to provide the light source unit 60, the projector 10 and the light source control method in which the intensity of light emitted can be controlled to adjust the brightness and color balance thereof to a wide extent.

In this embodiment, the two red light sources 121, 151 are disposed to be oriented differently so that light in the red wavelength range L1 emitted from the red light source 121 intersects light in the red wavelength range L2 emitted from the red light source 151. However, both the red light source device 121 and the red light source 151 may be aligned on the same plane. For example, the red light source 121 and the red light source 151 can be disposed so as to lie adjacent to each other. Additionally, as with the arrangement of the blue laser diodes 71, a total of five red light sources 121, 151 may be provided in such a way that red light sources 151 are arranged into a planar configuration of two rows by two columns with one red light source 151 disposed in the center of the four peripherally arranged red light sources 151. Additionally, assuming that an up-down direction is referred to as a row and a front-rear direction as a column, red light sources 121, 151 may be arranged into a matrix configuration when seen from thereabove. Even in the case where the red light sources 121, 151 are arranged into the matrix configuration, a red light source 121 can be disposed in a central portion. In the case where the red light source 121 and the red light sources 151 are arranged on the same plane in the way described above, a configuration may be adopted in which the first dichroic mirror 142 shown in FIG. 3 is not provided in the light source unit 60.

Additionally, in FIG. 3, the red light source 151 is disposed between the luminescent wheel 101 and the first dichroic mirror 142. However, the red light source 151 may be disposed in an arbitrary position; for example, the red light source 151 may be disposed so that the first dichroic mirror 142 is situated between the luminescent wheel 101 and the red light source 151. As this occurs, the first dichroic mirror 142 which combines light in the red wavelength range L1 and light in the red wavelength range L2 is disposed so that light in the red wavelength range L2 emitted from the red light source 151 is reflected towards the second dichroic mirror 141.

The light source unit 60 may include a red dichroic filter which diffuse transmits light in the red wavelength range to diffuse light in the red wavelength range emitted from the red light source 121, which is the laser diode. For example, the red dichroic filter is provided on a circular disc-shaped color wheel together with a blue dichroic filter and a green dichroic filter in such a way as to be disposed end to end with the blue and green dichroic filters in a circumferential direction. In the plan view of FIG. 3, the color wheel is provided between the collective lens 173 and the light tunnel 175 and is then driven to rotate. Additionally, the red dichroic filter which diffuse transmits light in the red wavelength range may be provided between the collective lens group 125 and the first dichroic mirror 142.

Thus, as has been described heretofore, the light source unit 60 and the projector 10 of the embodiment of the invention include the red light source 151 which emits light in the first wavelength range, the red light source 121 which emits light in the second wavelength range which is of the same color system as the light in the first wavelength range and which has the different wavelength therefrom, the other light sources which emit light of the different colors from those of the light in the first wavelength range and the light in the second wavelength range, and the control module 38. The control module 38 controls the red light sources to emit one or both of light in the first wavelength range and light in the second wavelength range by sharing time with light of the different colors. Thus, since the intensity and tone of light of the same color system can be controlled, it is possible to provide the light source unit 60, the projector 10 and the light source control method in which the intensity of light emitted can be controlled to adjust the brightness and color balance thereof to a wide extent.

In the light source unit 60, the other light sources are the excitation light shining device 70 which is made up of the plurality of blue laser diodes 71 emitting light in the third wavelength range and the green luminescent material body which is excited by the light in the third wavelength range to emit light in the fourth wavelength range. Thus, the light source unit 60 can be configured as the light source for forming a color image by combing the rays of light of the different colors by sharing time.

In the light source unit 60, when in the first mode where the red light source 151, which is the light emitting diode, is illuminated, light in the third wavelength range is emitted from the whole of the plurality of blue laser diodes 71 to thereby emit light in the third wavelength range and light in the fourth wavelength range as light source light. Thus, with the light source unit 60, the variation in color balance and luminance distribution can be reduced.

In the light source unit 60, when in the second mode where the red light source 121, which is the laser diode, is illuminated, light in the third wavelength range is emitted from the central blue laser diode 71 in the plurality of blue laser diodes 71, so that light in the third wavelength range and light in the fourth wavelength range are emitted as light source light. Thus, with the light source unit 60, the color purity of light in the red wavelength range can be enhanced. Additionally, in this case, the light in the second wavelength range emitted from the red light source 121 is substantially parallel light and the light in the third wavelength range emitted from the blue laser diode 71 is also substantially parallel light. Thus, with the light source unit 60, the light in the second wavelength range and the light in the third wavelength range become close to each other in relation to parallelism, and therefore, their illuminance distributions are allowed to come close to each other.

In the light source unit 60, when in the third mode where the red light source 151, which is the light emitting diode, and the red light source 121, which is the laser diode, are illuminated, light in the third wavelength range is emitted from the whole of the plurality of blue laser diodes 71, so that light in the third wavelength range and light in the fourth wavelength range are emitted as light source light. Thus, with the light source unit 60, it is possible to make the whole of the light source light emitted bright.

In addition, in the light source unit 60, in the third mode, light in the third wavelength range which is less intense is emitted from the peripherally disposed blue laser diodes in the whole of the plurality of blue laser diodes 71. Alternatively, light in the third wavelength range which is intense is emitted from the central blue laser diode 71. Thus, with the light source unit 60, the brightness of light in the red wavelength range can be enhanced while enhancing the color purity thereof.

In the light source unit 60, the light in the first wavelength range and the light in the second wavelength range are the light in the red wavelength ranges, the light in the third wavelength range is the light in the blue wavelength range, and the light in the fourth wavelength range is the light in the green wavelength range. Thus, with the light source unit 60, an arbitrary color image can be formed by using the three primary colors.

In the light source unit 60, the light in the first wavelength range is transmitted through the first dichroic mirror 142, and the light in the second wavelength range is reflected by the first dichroic mirror 142, whereby the light in the first wavelength range and the light in the second wavelength range are combined into the same optical path. Thus, with the light source unit 60, the rays of light of the same color system which are emitted from the light sources which are disposed in the positions situated apart from each other can be guided as a single pencil of light.

In the light source unit 60, the plurality of red light sources 151, 121 are arranged on the same plane, and hence, the plurality of rays of light having the different wavelength ranges can be guided into the same optical path without using a dichroic mirror.

In this embodiment, while it is described that when in the second mode where the red light source 121, which is the laser diode, is illuminated, the light in the third wavelength range is emitted from the central blue laser diode 71 in the plurality of blue laser diodes 71 (the third light source), the invention is not limited to this configuration. The blue laser diode 71 which emits the light in the third wavelength range is not limited to the central one as long as the relevant blue laser diode is part of the plurality of blue laser diodes 71.

These embodiments are presented as the examples and are not intended at all to limit the scope of the invention. The novel embodiments can be carried out in other various forms, and hence, various omissions, replacements and modifications can be made thereto without departing from the spirit and scope of the invention. The resulting embodiments and their modifications are included in the spirit and scope of the invention and are also included in the scope of inventions claimed for patent in claims and their equivalents.

What is claimed is:

1. A light source unit comprising:
   a first light source for emitting light in a first wavelength range;
   a second light source for emitting light in a second wavelength range which is of the same color system as the light in the first wavelength range and whose wavelength differs from that of the light in the first wavelength range;
   a third light source including a plurality of light emitting elements for emitting light in a third wavelength range which differs from the light in the first wavelength range and the light in the second wavelength range;
   a fourth light source for emitting light in a fourth wavelength range which is excited by the light in the third wavelength range as luminous light; and
   a control unit for controlling the illumination of the first light source, the second light source, the third light source and the fourth light source,
   wherein the control unit controls a number of light emitting elements in the plurality of light emitting elements of the third light source which are to be illuminated according to illuminated states of the first light source and the second light source.

2. The light source unit according to claim 1, wherein when in a second mode in which the first light source, which is a laser diode, is illuminated, the control unit causes the light in the third wavelength range to be emitted from part of the plurality of light emitting elements, so that the light in the third wavelength range and the light in the fourth wavelength range are emitted as light source light.

3. The light source unit according to claim 2, wherein when in a first mode in which the second light source, which is a light emitting diode, is illuminated, the control unit causes the light in the third wavelength range to be emitted from a greater number of light emitting elements in the plurality of light emitting elements than in the second mode, so that the light in the third wavelength range and the light in the fourth wavelength range are emitted as light source light.

4. The light source unit according to claim 3, wherein the part of the plurality of light emitting elements is a centrally disposed light emitting element in the plurality of light emitting elements.

5. The light source unit according to claim 4, wherein when in a third mode in which the second light source, which is the light emitting diode, and the first light source, which is the laser diode, are illuminated, the control unit causes the light in the third wavelength range to be emitted from all of the plurality of light emitting elements, so that the light in the third wavelength range and the light in the fourth wavelength range are emitted as light source light.

6. The light source unit according to claim 5, wherein in the third mode, the light in the third wavelength range is emitted less intensely from peripherally disposed light emitting elements or the light in the third wavelength range is emitted more intensely from a centrally disposed light emitting element, among the plurality of light emitting elements.

7. The light source unit according to claim 2, wherein the part of the plurality of light emitting elements is a centrally disposed light emitting element in the plurality of light emitting elements.

8. The light source unit according to claim 2, wherein when in a third mode in which the second light source, which is a light emitting diode, and the first light source, which is the laser diode, are illuminated, the control unit causes the light in the third wavelength range to be emitted from all of the plurality of light emitting elements, so that the light in the third wavelength range and the light in the fourth wavelength range are emitted as light source light.

9. The light source unit according to claim 2, wherein the light in the first wavelength range and the light in the second wavelength range are light in red wavelength ranges,
   wherein the light in the third wavelength range is light in a blue wavelength range, and
   wherein the light in the fourth wavelength range is light in a green wavelength range.

10. The light source unit according to claim 3, wherein when in a third mode in which the second light source, which is the light emitting diode, and the first light source, which is the laser diode, are illuminated, the control unit causes the light in the third wavelength range to be emitted from all of the plurality of light emitting elements, so that the light in the third wavelength range and the light in the fourth wavelength range are emitted as light source light.

11. The light source unit according to claim 3, wherein the light in the first wavelength range and the light in the second wavelength range are light in red wavelength ranges,
   wherein the light in the third wavelength range is light in a blue wavelength range, and
   wherein the light in the fourth wavelength range is light in a green wavelength range.

12. The light source unit according to claim 7, wherein when in a third mode in which the second light source, which is a light emitting diode, and the first light source, which is the laser diode, are illuminated, the control unit causes the light in the third wavelength range to be emitted from all of the plurality of light emitting elements, so that the light in the third wavelength range and the light in the fourth wavelength range are emitted as light source light.

13. The light source unit according to claim 12, wherein in the third mode, the light in the third wavelength range is emitted less intensely from peripherally disposed light emitting elements or the light in the third wavelength range is emitted more intensely from a centrally disposed light emitting element, among the plurality of light emitting elements.

14. The light source unit according to claim 1, wherein when in a third mode in which the second light source, which is a light emitting diode, and the first light source, which is a laser diode, are illuminated, the control unit causes the light in the third wavelength range to be emitted from all of the plurality of light emitting elements, so that the light in the third wavelength range and the light in the fourth wavelength range are emitted as light source light.

15. The light source unit according to claim 1, wherein the light in the first wavelength range and the light in the second wavelength range are light in red wavelength ranges,
wherein the light in the third wavelength range is light in a blue wavelength range, and
wherein the light in the fourth wavelength range is light in a green wavelength range.

16. The light source unit according to claim 1, comprising:
a first dichroic mirror which transmits the light in the first wavelength range and reflects the light in the second wavelength range so that the light in the first wavelength range and the light in the second wavelength range are combined into the same optical path.

17. The light source unit according to claim 1, wherein the first light source and the second light source are disposed on the same plane.

18. The light source unit according to claim 1, wherein the control unit controls so that the number of light emitting elements in the plurality of light emitting elements of the third light source which are to be illuminated when in a first mode in which the second light source, which is a light emitting diode, is illuminated, the number of light emitting elements in the plurality of light emitting elements of the third light source which are to be illuminated when in a second mode in which the first light source, which is a laser diode, is illuminated, and the number of light emitting elements in the plurality of light emitting elements of the third light source which are to be illuminated when in a third mode in which the second light source and the first light source are illuminated differ from one another.

19. A projector comprising:
the light source unit according to claim 1;
a display device onto which light source light is shone from the light source unit to thereby form image light; and
a projection-side optical system for projecting the image light emitted from the display device onto a screen,
wherein the control unit controls the display device and the light source unit.

* * * * *